United States Patent
Kabir et al.

(10) Patent No.: US 11,788,466 B2
(45) Date of Patent: Oct. 17, 2023

(54) COMPRESSED N2 FOR ENERGY STORAGE

(71) Applicant: Schlumberger Technology Corporation, Sugar Land, TX (US)

(72) Inventors: Omar M. Kabir, Waller, TX (US); Gary W. Sams, Spring, TX (US); Ronald J. Manson, Spring, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 384 days.

(21) Appl. No.: 16/769,886

(22) PCT Filed: Dec. 10, 2018

(86) PCT No.: PCT/US2018/064705
§ 371 (c)(1),
(2) Date: Jun. 4, 2020

(87) PCT Pub. No.: WO2019/113575
PCT Pub. Date: Jun. 13, 2019

(65) Prior Publication Data
US 2020/0386156 A1    Dec. 10, 2020

Related U.S. Application Data

(60) Provisional application No. 62/596,240, filed on Dec. 8, 2017.

(51) Int. Cl.
*F02C 6/14* (2006.01)
*F02C 3/13* (2006.01)
(Continued)

(52) U.S. Cl.
CPC .......... *F02C 6/14* (2013.01); *F02C 3/13* (2013.01); *F02C 6/06* (2013.01); *F02C 7/08* (2013.01);
(Continued)

(58) Field of Classification Search
CPC ........ B01D 53/047; B01D 53/228; F02C 6/14
See application file for complete search history.

(56) References Cited

U.S. PATENT DOCUMENTS 3,485,053 A * 12/1969 Grenier .................. F25J 1/0208
62/913
5,447,555 A * 9/1995 Ye ........................ C01B 13/0251
96/9
(Continued)

FOREIGN PATENT DOCUMENTS

| EP | 2662552 A1 | 11/2013 |
|---|---|---|
| GB | 2093917 A | 9/1982 |
| WO | 2013153019 A1 | 10/2013 |

OTHER PUBLICATIONS

International Preliminary Report on Patentability Issued in the PCT Application PCT/US2018/064705, dated Jun. 18, 2020 (6 pages).
(Continued)

*Primary Examiner* — Gerald L Sung
(74) *Attorney, Agent, or Firm* — Jeffrey D. Frantz

(57) ABSTRACT

This disclosure describes a power system that includes a first compressor with an air inlet and a compressed air outlet; a nitrogen separator coupled to the compressed air outlet, the nitrogen separator comprising a nitrogen concentrate outlet and a byproduct outlet; a second compressor coupled to the nitrogen concentrate outlet, the second compressor having a high pressure outlet for supplying high pressure concentrated nitrogen to an underground storage; and a turbine generator with an inlet for high pressure concentrated nitrogen for coupling to an underground storage.

22 Claims, 2 Drawing Sheets

(51) Int. Cl.
    *F02C 6/06*         (2006.01)
    *F02C 7/08*         (2006.01)

(52) U.S. Cl.
    CPC ...... *F05D 2210/12* (2013.01); *F05D 2220/32* (2013.01)

(56) References Cited

U.S. PATENT DOCUMENTS

| | | | |
|---|---|---|---|
| 2002/0174659 A1* | 11/2002 | Viteri | H01M 8/0662 60/39.12 |
| 2003/0089126 A1* | 5/2003 | Stringer | F25J 3/04303 62/643 |
| 2009/0297333 A1* | 12/2009 | Mirsky | F04D 27/0261 415/36 |
| 2011/0000221 A1* | 1/2011 | Minta | E21B 43/18 60/722 |
| 2012/0118137 A1 | 5/2012 | Fong et al. | |
| 2012/0247105 A1* | 10/2012 | Nelson | F01K 23/068 60/698 |
| 2012/0255292 A1 | 10/2012 | Fong et al. | |
| 2012/0260645 A1 | 10/2012 | Fong et al. | |
| 2012/0269651 A1 | 10/2012 | Fong et al. | |
| 2012/0286522 A1 | 11/2012 | Stahlkopf et al. | |
| 2012/0291989 A1 | 11/2012 | Fong et al. | |
| 2013/0042601 A1 | 2/2013 | Kraft | |
| 2013/0047597 A1 | 2/2013 | Fong et al. | |
| 2013/0061591 A1 | 3/2013 | Bove et al. | |
| 2013/0104533 A1 | 5/2013 | Fong et al. | |
| 2013/0108480 A1 | 5/2013 | Fong et al. | |
| 2013/0111895 A1 | 5/2013 | Fong et al. | |
| 2013/0126014 A1 | 5/2013 | Fong et al. | |
| 2013/0168961 A1 | 7/2013 | Stahlkopf et al. | |
| 2013/0219892 A1 | 8/2013 | Havel | |
| 2013/0232974 A1 | 9/2013 | Nakhamkin | |
| 2013/0240068 A1 | 9/2013 | Samara-Rubio et al. | |
| 2013/0276440 A1 | 10/2013 | Fong et al. | |
| 2013/0291529 A1 | 11/2013 | Stahlkopf et al. | |
| 2013/0291960 A1 | 11/2013 | Fong et al. | |
| 2013/0294943 A1 | 11/2013 | Fong et al. | |
| 2013/0307269 A1 | 11/2013 | Fong et al. | |
| 2013/0333373 A1 | 12/2013 | Fong et al. | |
| 2014/0026549 A1 | 1/2014 | Fong et al. | |
| 2014/0026584 A1 | 1/2014 | Naeve | |
| 2014/0053552 A1 | 2/2014 | Im et al. | |
| 2014/0137563 A1 | 5/2014 | Kerth et al. | |
| 2014/0183869 A1 | 7/2014 | Enis et al. | |
| 2014/0196456 A1 | 7/2014 | Zhou et al. | |
| 2014/0208730 A1 | 7/2014 | Kraft | |
| 2014/0216022 A1 | 8/2014 | Jiang | |
| 2014/0230444 A1* | 8/2014 | Hao | F01D 25/305 60/39.5 |
| 2014/0260230 A1 | 9/2014 | Richards et al. | |
| 2014/0260948 A1 | 9/2014 | Cherepashenets et al. | |
| 2014/0333069 A1 | 11/2014 | Lieberman | |
| 2015/0033724 A1 | 2/2015 | Fong et al. | |
| 2015/0054291 A1 | 2/2015 | Stahlkopf et al. | |
| 2015/0075173 A1 | 3/2015 | Berti et al. | |
| 2015/0096289 A1 | 4/2015 | Pedretti-Rodi et al. | |
| 2015/0125210 A1* | 5/2015 | Ingersoll | F02C 6/16 405/55 |
| 2015/0263589 A1 | 9/2015 | Castor | |
| 2015/0322874 A1 | 11/2015 | Scuderi et al. | |
| 2016/0053682 A1 | 2/2016 | Page | |
| 2016/0079830 A1 | 3/2016 | Schneider | |
| 2016/0169210 A1* | 6/2016 | Mishima | F03G 6/064 60/641.8 |
| 2016/0177822 A1 | 6/2016 | Howes et al. | |
| 2016/0190867 A1 | 6/2016 | Ginart et al. | |
| 2016/0228807 A1 | 8/2016 | Snow, Jr. et al. | |
| 2016/0273529 A1 | 9/2016 | Stahlkopf et al. | |
| 2016/0326958 A1 | 11/2016 | Kosamana et al. | |
| 2016/0348637 A1 | 12/2016 | Bachli | |
| 2016/0356421 A1 | 12/2016 | Fong et al. | |
| 2017/0002246 A1 | 1/2017 | Bannari | |
| 2017/0059212 A1* | 3/2017 | Giardinella | F03D 9/17 |

OTHER PUBLICATIONS

International Search Report and Written Opinion Issued in the PCT Application PCT/US2018/064705, dated Mar. 14, 2019 (7 pages).

* cited by examiner

COMPRESSED N2 FOR ENERGY STORAGE

CROSS-REFERENCE TO RELATED APPLICATIONS

This application claims benefit of U.S. Provisional Patent Application Ser. No. 62/596,240 filed Dec. 8, 2017, which is incorporated herein by reference.

FIELD

This application generally relates to electrical energy storage methods, and particularly to converting electrical energy to pressure energy, and vice versa, using compressed gas, such as nitrogen gas, for energy storage.

BACKGROUND

Electrical power storage is a great challenge facing the energy industry. While chemical energy sources derive power from chemical bonds, which can be stored as a liquid in a tank, renewable energy sources such as wind and solar power cannot be conveniently and efficiently stored to meet high demand in the future. For example, peak production periods for renewable energy sources may not coincide with peak demand periods for electric power. To balance supply and demand at power generation units in the absence of storage, the units must be started and stopped as demand fluctuates. Such programs increase wear-and-tear on production facilities, and require predictive technologies to maintain power supply as loads increase.

It has been estimated that the world needs 40 TWh of battery storage to allow for 45% of power to be generated from renewable sources by 2030. Lithium ion battery technology is progressing to provide mass storage of electrical energy for years to come. However, demand is projected to outstrip supply in the intermediate term. Lithium demand today is about 32,000 metric tons per year, and growing. Global lithium reserves have been estimated at 13.5 million metric tons, with Chile and China together holding about 82% of global reserves. The price of lithium has already tripled since late 2015 due to surging demand for electric vehicles.

Pumped hydropower is a known technology that relies on pumping a fluid, such as water, from a low gravitational potential to a higher gravitational potential, and then reclaiming that potential energy later. Such systems are typically predicated on large, usually naturally occurring, volumes of water nearby each other, and expensive pumping and recovery infrastructure to deliver relatively meager returns in power storage. Compressed air storage technologies are also known, but containment suitable for compressed air, with its oxygen and moisture content is relatively limited so deployment of such technology will require construction of suitable containment.

With lithium supplies already sounding a warning klaxon regarding future supply of lithium battery energy storage, and other known technologies facing limits elsewhere, there is a need for new very large energy storage solutions.

SUMMARY

In one embodiment, this disclosure describes a power system that includes a first compressor with an air inlet and a compressed air outlet; a nitrogen separator coupled to the compressed air outlet, the nitrogen separator comprising a nitrogen concentrate outlet and a byproduct outlet; a second compressor coupled to the nitrogen concentrate outlet, the second compressor having a high pressure outlet for supplying high pressure concentrated nitrogen to an underground storage; and a turbine generator with an inlet for high pressure concentrated nitrogen for coupling to an underground storage.

Also described herein is a power storage system that includes a first compressor with an air inlet and a compressed air outlet; a nitrogen separator coupled to the compressed air outlet, the nitrogen separator comprising a nitrogen concentrate outlet and a byproduct outlet; a second compressor coupled to the nitrogen concentrate outlet, the second compressor having a high pressure outlet for supplying high pressure concentrated nitrogen to an underground storage; a turbine generator with high pressure concentrated nitrogen inlet for coupling to the underground storage and a gas outlet coupled to the nitrogen concentrate outlet; and a thermal recovery unit coupled to the inlet of the turbine generator.

Also described herein is a power storage system coupled to a hydrocarbon reservoir. The power storage system includes a first compressor with an air inlet and a compressed air outlet; a liquids collector coupled to the compressed air outlet; a nitrogen membrane unit coupled to the liquids collector, the nitrogen membrane unit comprising a nitrogen concentrate outlet and a byproduct outlet; a second compressor coupled to the nitrogen concentrate outlet, the second compressor having a high pressure outlet for supplying high pressure concentrated nitrogen to an underground storage; a turbine generator with high pressure concentrated nitrogen inlet for coupling to the underground storage and a gas outlet coupled to the nitrogen concentrate outlet; and a thermal recovery unit coupled to the inlet of the turbine generator.

BRIEF DESCRIPTION OF THE DRAWINGS

Implementations of the present disclosure, briefly summarized above and discussed in greater detail below, can be understood by reference to the illustrative implementations of the disclosure depicted in the appended drawings. It is to be noted, however, that the appended drawings illustrate only typical implementations of this disclosure and are therefore not to be considered limiting of its scope, for the disclosure may admit to other equally effective implementations.

Figures 1A, 1B:
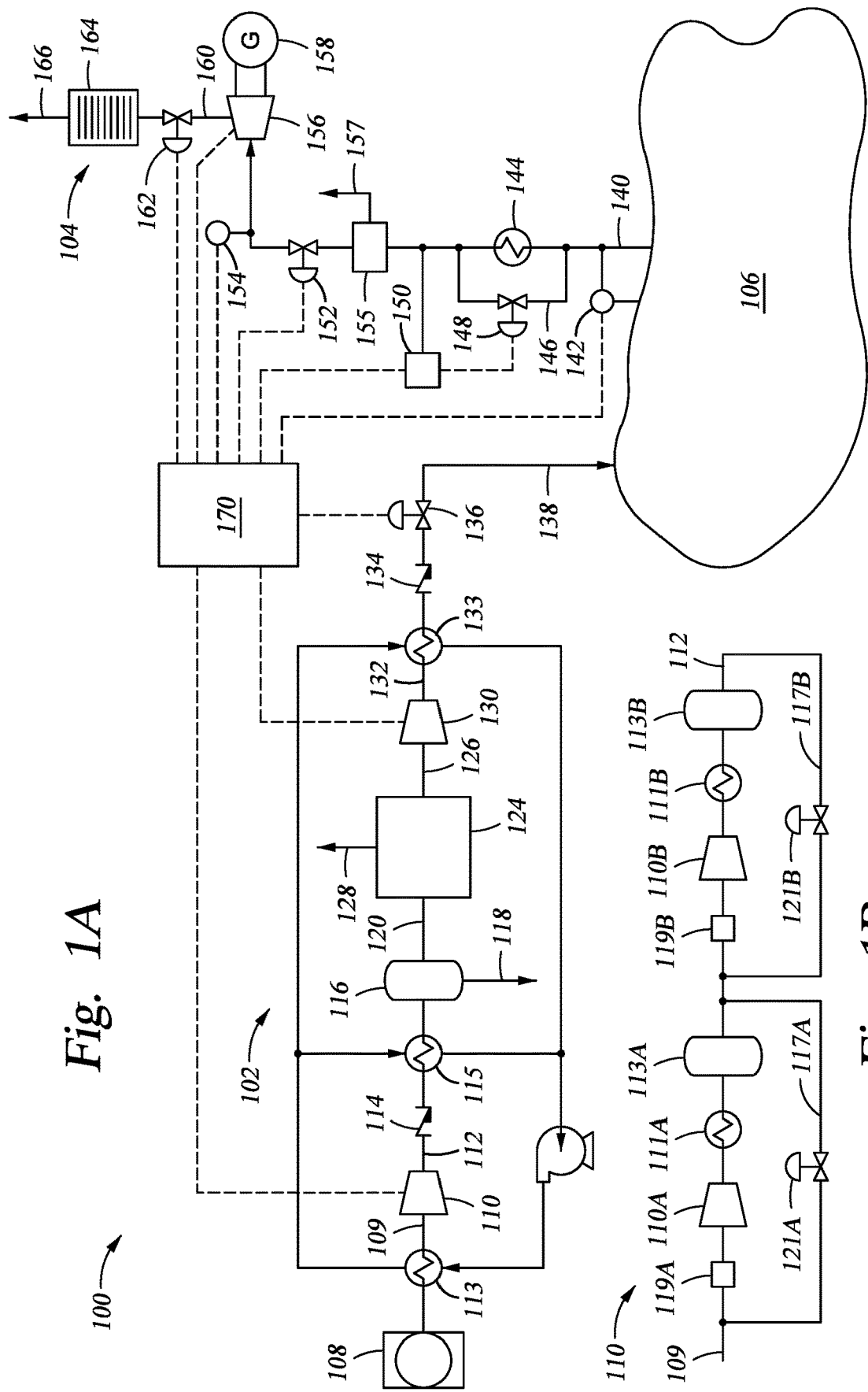
FIG. 1A is a schematic configuration diagram of a power storage system according to one embodiment.
FIG. 1B is a schematic configuration diagram of a compressor system according to one embodiment.

To facilitate understanding, identical reference numerals have been used, where possible, to designate identical elements that are common to the figures. The figures are not drawn to scale and may be simplified for clarity. It is contemplated that elements and features of one implementation may be beneficially incorporated in other implementations without further recitation.

DETAILED DESCRIPTION

This disclosure describes methods and apparatus for power generation and energy storage. FIG. 1A is a schematic configuration diagram of an energy storage system 100 according to one embodiment. The energy storage system 100 includes an energy storage section 102 and an energy recovery section 104, both coupled to a storage volume 106. The energy storage section 102 uses deployable power, such as electricity, to pressurize a gas substantially depleted in oxygen, for example oxygen-depleted air or nitrogen gas, into the storage volume 106. The energy recovery section 104 recovers the energy stored in the pressurized gas to generate electricity. The storage volume 106 may be underground or above ground, and may be natural or man-made. The energy storage systems described herein, including the energy storage system 100, may be adapted for use with hydrocarbon reservoirs as underground power storage. A gas substantially depleted in oxygen, such that the oxygen content of the gas is reduced below an explosive, or combustion, limit at elevated pressures can be used in the presence of hydrocarbon vapors without risk of explosion or fire.

The gas to be prepared for pressurized storage is provided to a first compressor 110 through an inlet 109. A filter 108, which may be self-cleaning, may be coupled to the inlet to remove particulates. A high-flow air filter medium, such as one or more pleated cartridge filters, or a self-cleaning pulse filter, or a gas turbine inlet filter may be used for large installations. A preheater may be used to heat the material in the inlet to a convenient temperature for processing, for example a temperature above the dew point of the material. The first compressor 110 may raise the pressure of the gas to a pressure of 3-10 barg, such as 4-7 barg, for example about 6 barg. The first compressor 110 may raise the pressure of the gas to a pressure above 10 barg in some cases. The inlet pressure of the first compressor 110 may be atmospheric, or may be somewhat elevated to optimize operation of the filter 108. The gas to be prepared for pressurized storage may be ambient air at any naturally occurring temperature and humidity, or may be pre-treated air (for example dried purified air). Additionally, the gas may be an air fraction or extract that is depleted in oxygen to any degree, including pure or substantially pure nitrogen. In general the gas may be provided to the inlet of the first compressor 110 at an ambient temperature from below 0° C. to above 40° C., for example from artic temperatures such as −30° C. to desert temperatures such as 50° C., and a pressure from about 0.8 barg to about 4 barg, including any ambient pressure. In one embodiment, the first compressor 110 is an integral gear compressor with discharge pressure ranging from 30 barg to 110 barg. Other types of compressors, such as positive displacement compressors, which may be rotary or piston driven, may be used as well.

The first compressor 110 may be a multi-stage compressor or a multi-compressor installation or system. The first compressor 110 has a capacity rated to the service. In one example, two to six stages of compression may be used in some cases for gas flow capacity of 1,200 to 500,000 Nm$^3$/hr. In general, the first compressor 110 may be sized to any scale of operation, and indeed operations involving hydrocarbon reservoirs may utilize many cubic kilometers of storage volume with very large compression and recovery operations. When the first compressor 110 comprises a plurality of individual compressors, the compressors may be multi-stage integrally geared or multi-stage positive displacement compressors, of reciprocating or rotary type. The compressors may be arranged in series, with the outlet of one compressor flowing to the inlet of another compressor, or in parallel, with the inlet gas divided between the compressors by flow controls if desired, and the outlet gas combined into a single line.

The first compressor 110 may be equipped with air or water cooled inter-stage thermal units and liquid collection vessels. FIG. 1B is a schematic configuration diagram of a compressor system that may be used as the compressor 110. The compressor 110, embodied in the compressor system of FIG. 1B, has two compression stages 110A and 110B. Following each of the compression stages 110A and 110B is a thermal recovery unit, 111A and 111B respectively, to recover heat of compression. This heat of compression may be deployed in any convenient manner to improve the efficiency of the system 100. In addition, the outlet of each compression stage 110A and 110B may be equipped with a liquid collector, 113A and 113B respectively, for collecting any condensed liquids. The compressor 110, as embodied by the compressor system of FIG. 1B, may also be equipped with a recycle stream, 117A and 117B respectively, for each compression stage 110A and 110B, or a single recycle stream across all the compression stages. The recycle stream may feature a control valve, 121A and 121B respectively in FIG. 1B, to control compressor surge. The compressor 110, embodied in the compressor system of FIG. 1B, may feature an inlet controller, 119A and 119B respectively, for each compression stage 110A and 110B (or only for one compression stage), such as a valve or inlet guide vane, to control gas flow volume and/or inlet pressure to the compressor 110.

The first compressor 110 has a compressed gas outlet 112, which may be a compressed air outlet when air is the gas that is compressed in the first compressor 110. The compressed gas may be flowed through a check valve 114 to prevent reverse flow into the compressor during start or after shutdown of the first compressor 110. In the case where multiple compressors are used, each individual compressor may use a check valve in the outlet of the compressor, whether the compressors are arranged in series or in parallel. The compressed gas may also be flowed through a thermal conditioner 115 to adjust the temperature of the compressed gas for subsequent processing. Heat recovered from the thermal conditioner 115 may be integrated to the preheater using a thermal balancing loop that circulates a thermal medium between the exchangers 115 and 113. The compressed gas outlet 112 may be coupled to a liquids remover 116, for example a liquids collection drum or a desiccator, for handling any condensate arising from the first compression stage. A liquid stream 118 may be withdrawn from the liquids remover 116 at a low point on the liquids remover 116. The liquid stream 118 may be released to the environment, if appropriate, through a safe environmental sewer system, or the liquid stream 118 may be treated before release or used for other processing. The liquid stream 118, which may be condensate from moist air in some cases, may contain water or other readily condensable substances.

A liquids-relieved compressed gas 120 leaves the liquids remover 116 and flows to a nitrogen separator 124. The nitrogen separator 124 may be a membrane separator, a permeation separator such as a PSA unit, or a thermodynamic separator such a cryogenic distillation unit or other cryogenic separator. A membrane separator, such as a hollow fiber membrane separator, may be used to separate oxygen from other gases such as nitrogen and argon with acceptable efficiency. Multiple stages of filtration, for example 2-10 stages of filtration, can be used to increase purity of the filtered nitrogen. Membrane nitrogen generators available from Schlumberger Ltd., of Houston, Tex., may be used as the nitrogen separator 124.

The nitrogen separator 124 has a nitrogen concentrate outlet 126 and a byproduct outlet 128. The nitrogen concentrate outlet 126 may be essentially pure nitrogen, or may be 90% or more nitrogen by volume, for example 95% or 99.5% pure nitrogen by volume. The byproduct outlet 128 may be a mixture of impurities, or may constitute more than one impurity stream. For example, in the case of air, such as ambient air or air purified in any way, or in the case of an air-like compressed gas, the impurity stream may include oxygen, $CO_2$, argon, helium, and other minor air components. For example, the nitrogen separator 124 may be configured to yield a substantially pure oxygen stream, which may be used for other processing.

The nitrogen concentrate outlet 126 is routed to a second compressor 130, which boosts the pressure of the nitrogen concentrate. In one case, the second compressor 130 boosts the pressure of the nitrogen concentrate to a pressure of 50-100 barg, for example about 80 barg. In other cases, the first compressor 110 can pressurize the compressed gas outlet 112 to a much higher pressure, for example up to 120 barg, to provide higher pressure for membrane separation. The second compressor 130 can then be used to recover pressure in the nitrogen concentrate following membrane separation.

The second compressor 130 may be, or use, the same type or types of compressors, optionally with inter-stage thermal recovery, as the first compressor 110, and may be configured as a multi-stage compressor or multiple compressors arranged in series or parallel, as described above. In the event the first compressor 110 removes substantially all condensables from the nitrogen concentrate outlet 126, liquid collectors may not be needed in the second compressor 130. In one embodiment, the second compressor 130 includes up to six compressors or compression stages for a flow capacity of 500 $Nm^3$/hr to 85,000 $Nm^3$/hr. The second compressor 130 is generally scaled to the size of the installation, and may be any size needed for the required duty. The second compressor 130 may also be equipped with the same volume and safety control system as the first compressor 110. The second compressor 130 has a high pressure outlet 132 for supplying high pressure concentrated nitrogen to a storage volume 106, which may be an underground storage. As noted above, the storage volume 106 may be a hydrocarbon reservoir, which may be depleted, or other natural reservoir or manmade underground reservoir.

Heat of compression may be recovered from the high pressure outlet 132 using a compression thermal recovery heat exchanger 133. The high pressure concentrated nitrogen is cooled by the compression thermal recover heat exchanger 133 to a temperature suitable for storage in the storage volume 106, for example 20-50° C. Recovered heat of compression may be integrated to the preheater, if desired, using the thermal balancing loop further connected between the exchangers 133 and 113.

The high pressure outlet 132 may be routed to the storage volume 106 through a check valve 134 and a pressurized gas control valve 136 via a storage line 138. If the storage volume 106 is a depleted hydrocarbon reservoir, the storage line 138 may be coupled to the reservoir wellhead. The pressures described above are generally suitable for the class 600 piping commonly used for hydrocarbon wellheads. Removing oxygen and water from the gas lowers, or substantially prevents, the possibility of corrosion in the piping system.

The energy recovery section 104 includes an energy recovery expander 156 with a high pressure concentrated nitrogen inlet 140 that couples to the storage volume 106. The energy recovery expander 156 is coupled to a generator 158, the two forming a turbine generator. Gas from the storage volume 106 is released to the inlet of the energy recovery expander 156, powering the generator to produce electricity, which can be provided to the external power grid. In this way, the energy recovery section 104 converts pressure in the stored gas into electricity, recovering the power originally stored in the pressurized gas. A pressure sensor 142 may be coupled to the high pressure concentrated nitrogen inlet 140 to allow monitoring of the pressure of the storage volume 106. The controller 170 may be coupled to the pressure sensor 142 to monitor the pressure of the storage volume 106 utilizing the volume control system of each of the compressors 110 and/or 130.

A thermal conditioner 144 may be coupled to the high pressure nitrogen inlet 140 to recover any excess heat the released gas may be carrying, or to utilize recovered heat of compression, to adjust the thermal condition of the gas prior to entering the power recovery expander 156. If attractive and available from a local waste heat recovery system, external thermal heat may be added to the thermal conditioner 144 to enhance or increase the power generation of the power recovery expander 156. Alternately, if attractive, excess heat in the gas of the high pressure nitrogen inlet 140 may be recovered in the thermal conditioner 144 and returned to the preheater, depending on the specific system configuration. A bypass 146 may be provided around the thermal conditioner 144 to provide a method of thermal control. A thermal sensor 150, such as a temperature sensor, may be provided in the high pressure nitrogen inlet 140 downstream of the bypass 146 to allow monitoring of the temperature of the released gas. The thermal sensor 150 may be a thermostat. The controller 170 may be coupled to the thermal sensor 150 and the bypass control valve 148, and may adjust the bypass flow by manipulating the bypass control valve 148 to control the temperature of the released gas at the thermal sensor 150.

If necessary to avoid charging substantial liquids to the energy recovery expander 156, a phase separator 155 may be coupled to the high pressure nitrogen inlet 140 to the power recovery expander 156. The phase separator 155 may be a membrane separator, a wire mesh structure, a distillation apparatus, or the like. A liquid stream 157 may be recovered from the phase separator 155 and routed to any convenient use. For example, hydrocarbons recovered from the phase separator 155 may be used for fuel or recovered into any usable product stream.

A release pressure control valve 152 controls inlet pressure at the energy recovery expander 156. A pressure sensor 154 may be coupled to the turbine inlet to allow monitoring of turbine inlet pressure. The controller 170 may be coupled to the pressure sensor 154 to monitor turbine inlet pressure and may adjust the release pressure control valve 152 to control the turbine inlet pressure. To reduce the turbine inlet pressure below the pressure in the storage volume 106, the controller 170 will manipulate the release pressure control valve 152 to throttle the flow and create a pressure drop. The release gas flow rate can be independently controlled using the vent control valve 162. To increase turbine inlet pressure at constant flow rate, the release pressure control valve 152 is opened incrementally while the vent control valve 162 is closed incrementally. To decrease turbine inlet pressure at constant flow rate, the release pressure control valve 152 is closed incrementally while the vent control valve 162 is opened incrementally.

The released gas drives the power recovery expander 156, which powers the generator 158. The released gas loses pressure in the process and exits the energy recovery expander 156 through a gas outlet 160. The pressure in the turbine outlet 160 will vary with release gas flow rate. Above the operable threshold of the turbine, pressure in the turbine outlet will rise as gas flow increases. The gas outlet 160 is coupled to a vent 166 by a vent silencer 164, and a vent control valve 162, or flare system, can be used to control rate of gas venting and/or rate of gas release from the storage volume 106. Vent gas bearing hydrocarbon could also be used as a fuel source or as an injection gas in oil and gas drilling. The power generator system (i.e. power recovery expander 156 and generator 158) may be a commercial generating unit. The turbine may be a radial inlet turbine, and the generator may be a commercial generator set. Suitable system will have complete electricity control suitable for interconnecting with a power grid system.

The controller 170 is operatively coupled to the first compressor 110, the second compressor 130, the pressurized gas control valve 136, the pressure sensor 142, the bypass control valve 148, the thermal sensor 150, the release gas control valve 152, and the vent control valve 162. The controller monitors pressures, temperatures, and flow rates throughout the system 100, driving the system 100 to convert, for example, grid electricity into pressure of the storage gas.

Figure 2:
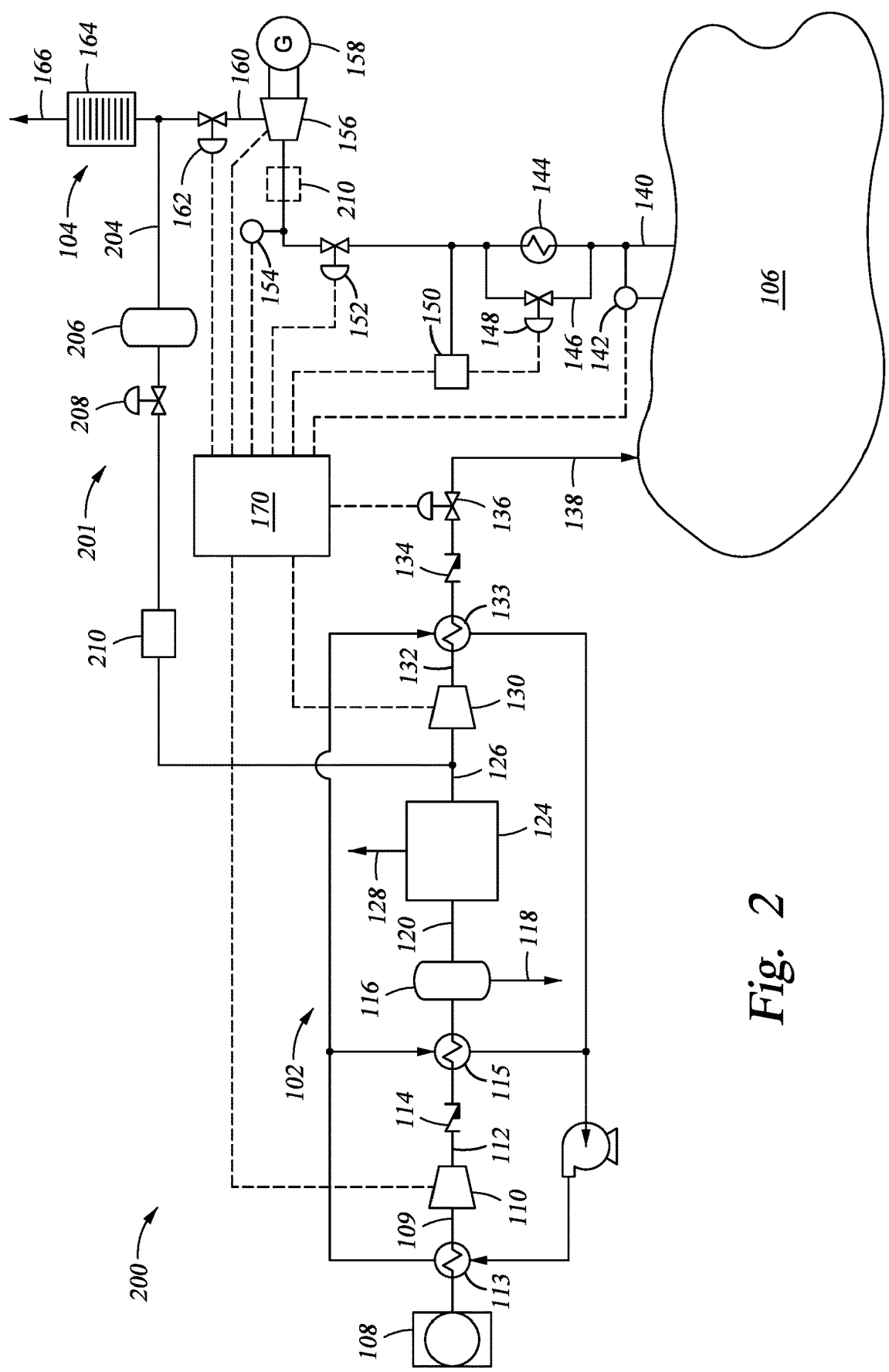
FIG. 2 is a schematic configuration diagram of a power storage system according to another embodiment.

FIG. 2 is a schematic configuration diagram of a power storage system 200 according to another embodiment. The power storage system 200 includes substantially the same power storage section 102 and energy recovery section 104 as the power storage system 100 of FIG. 1A, but also includes a gas recycle section 201. The gas recycle section 201 couples the outlet of the energy recovery expander 156 to the nitrogen concentrate outlet 126. The gas recycle section 201 includes a recycle gas line 204 coupled to the vent line 166 upstream of the vent silencer 164 and to the nitrogen concentrate outlet 126. A recycle gas control valve 208 may be provided in the recycle gas line 204 to provide control over the recycle gas rate.

A gas storage 206 may be included to decouple flow from the vent line 166 somewhat from flow into the nitrogen concentrate outlet 126. The gas storage may be naturally occurring or man-made. For example, the storage volume 106 and the gas storage 206 may both be depleted hydrocarbon reservoirs. Alternately, the storage volume 106 may be a hydrocarbon reservoir and the gas storage 206 may be a drum, which may be underground, natural or manmade, or above ground. The gas storage 206 may, in some cases, function to recompress the outlet gas from the energy recovery expander 156, instead of venting or flaring. In such cases, the pressure of the reservoir 206 is controlled to meet or slightly exceed the inlet pressure of the second compressor 130. The gas storage 206 may, in some cases, also function as a liquids collector in the event that gases from the storage volume 106 are condensed by the thermal conditioner 144. A manmade liquids collector may alternately be provided coupled directly to the thermal conditioner 144.

A gas reconditioner 210 may be included along the recycle gas line 204 to remove any gases not suitable for recycling into the power storage section 102, such as hydrocarbon gases and/or sulfur-bearing gases. The gas reconditioner 210 may also adjust the temperature and pressure of the recycle gas in the recycle gas line 204. The gas reconditioner 210 may include a gas separator such as a distillation apparatus, an absorption apparatus, a stripping apparatus, a combustion apparatus, or another suitable gas separator. In some cases, the gas reconditioner 210 may be a membrane nitrogen generator. The gas reconditioner 210 is shown in FIG. 2 between the recycle gas control valve 208 and the junction of the recycle gas line 204 and the nitrogen concentrate outlet 126, but the gas reconditioner 210 may be anywhere along the recycle gas line 204. For example, the gas reconditioner 210 may be positioned between the pressure sensor 154 and the energy recovery expander 156, as shown in phantom in FIG. 2, or between the thermal conditioner 144 and the release gas control valve 152, as shown in FIG. 1, to remove any materials, such as liquids, that might be incompatible with operation of the power recovery expander 156. The gas storage 206 is shown between the junction of the recycle gas line 204 and the vent line 166 and the recycle gas control valve 208, but the gas storage 206 may also be anywhere along the recycle gas line 204.

The controller 170 can be coupled to the recycle gas control valve 208 to control recycle gas flow rate. In one implementation, the controller may control a ratio of fresh gas flow to recycle gas flow, which may be called a makeup gas ratio. In some cases the ratio may be zero, at least temporarily until leakage within the storage volume 106 (i.e. leakage out of the hydrocarbon reservoir through geologic structures) reduces pressure in the storage volume 106 to an undesirably low level, as detected by the pressure sensor 142 and monitored by the controller 170. The controller 170 can then increase the ratio to add fresh gas to the system and raise the pressure of the storage volume 106 to a nominal level. In the absence of a recycle gas reconditioner such as the reconditioner 210, the controller 170 may adjust the makeup gas ratio to control or reduce impurities in the gas extracted from the storage volume 106, such as hydrocarbons. As the gas is recycled through the storage volume 106, such impurities may increase to an undesirable level. At that time, the controller 170 can increase the makeup gas ratio to bring fresh gas into the system. Flow out the vent line 166 will increase accordingly, carrying impurities out of the system with vent gas.

The apparatus described above, the power storage system 100 and the power storage system 200, can be used to practice a method of power storage and recovery. The first and second compressors 110 and 130 transform deployable power, such as electricity, into pressure in the gas stored in the storage volume 106. When power is readily available and/or prices for power are attractive, the power storage section 102 can be operated to transform electric power from the power grid into pressurized gas in the storage volume 106. Gas byproducts, if any, may be sold or upgraded to provide additional incentive for operating the power storage section 102. The systems 100 and 200 may be operated in this manner until the storage volume 106 reaches a pressure limit or until consumption of power in the power storage section 102 is no longer attractive. The controller 170 can monitor power price and availability, and pressure in the storage volume using the pressure sensor 142, and when a stop condition is reached the controller 170 can signal the compressors 110 and 130 and the control valve 136 to shut down, or idle, in an orderly fashion.

When power is in short supply or prices for power are high, the energy recovery section 104 can be operated to transform pressure of the pressurized gas stored in the storage volume 106 into electricity. The control valve 152 can be opened, allowing pressurized gas to flow into the energy recovery expander 156 to drive the generator 158 to make electric power, which can be delivered into the power grid. As noted above, the controller 170 can monitor power price and availability, and when a start condition is reached the controller 170 can signal the control valve 152 to open. The systems 100 and 200 may be operated in this manner until the storage volume 106 empties or pressure in the storage volume 106 drops below an operable threshold, or until recovery of power in the energy recovery section 104 is no longer attractive.

Thus, the power storage section 102 can be operated and the energy recovery section 104 idle at a first power availability, and the power storage section 102 can be idle and the energy recovery section 104 operated at a second power availability lower than the first power availability. Alternately, the power storage section 102 can be operated and the energy recovery section 104 idle at a first power price, and the power storage section 102 can be idle and the energy recovery section 104 operated at a second power price higher than the first power price. In some embodiments, both the power storage section 102 and the energy recovery section 104 can be operated at a third power availability between the first and second power availability, or at a third power price between the first and second power price.

In operating the power storage section 102, conventional air, for example ambient air, may be used as the starting gas, or other gases may be used. For example, pure nitrogen could be charged directly to the second compressor 130, air that has been modified in some way could be used as the starting gas, or specific mixtures of gases that are not air could be used as the starting gas. For example, air that has been dried could be used as the starting gas, air that has been concentrated in nitrogen to any extent could be used, a mixture of nitrogen with any of helium, argon, or other inert or substantially inert gas could be used. In some cases, if the storage volume is a hydrocarbon reservoir that no longer produces, a gas that can extract hydrocarbon vapors from the residue, for example $CO_2$, hydrogen, or another extraction gas may be included in the pressurized gas. When such gas is released through the energy recovery expander 156 and exits through the vent 166, the gas may be routed to a hydrocarbon recovery plant for extraction of the hydrocarbons. In the apparatus 200, the gas reconditioner 210

The start and stop conditions may overlap in ways that have the power storage section 102 and the energy recovery section 104 operating at the same time. Under such conditions, the controller 170 may control both sections to maintain a substantially constant pressure in the storage volume 106, should such operating mode become attractive. The controller 170 may slow the gas release rate by incrementally closing the vent control valve 162 to allow pressure to build in the storage volume 106 without consuming additional power in the compressors 110 and 130, or the controller may add power to the compressors to add gas to the storage volume 106, if it is attractive to do so. The controller 170 may reduce pressure in the storage volume 106 by reversing such procedures.

Using the power storage system 200, pressurized gas released from the storage volume 106 can be reused by routing depressurized gas exiting the energy recovery expander 156 from the vent line 166 into the recycle system. By recycling released gas, power input to the first compressor 110 can be reduced. In some cases, the storage volume 106 may have liquid in it while being used for pressurized gas storage. If the liquid is hydrocarbon, the pressurized gas may volatilize some of the hydrocarbon. Recycling the released gas affords the opportunity to recover those hydrocarbons. In some embodiments, a hydrocarbon analyzer may be included in the gas reconditioner 210 and coupled to the controller 170 so the controller 170 can operate the gas reconditioner 210 to optimize the gas composition for power storage as well as liquids extraction. For example, using a gas with a low level of hydrocarbon may facilitate geologic extraction in the storage volume 106 while allowing for liquids venting.

The power storage systems 100 and 200 described herein may be deployed as substantially fixed installations, or as mobile installations. For example, all or part of the systems 100 and 200 may be configured on skids or trailers to allow deployment in remote areas where a naturally occurring storage volume may be found. Systems such as those described herein, from skid sized systems up to very large power plants, can be used with hydrocarbon reservoirs which can be very large. Such reservoirs can provide steady flows of gas at pressure for months after being fully pressurized. Such facilities promise to deliver gigajoule quantities of energy over long durations.

While the foregoing is directed to implementations of the present disclosure, other and further implementations of the disclosure may be devised without departing from the basic scope thereof.

The invention claimed is:

1. A power system, comprising:
a first compressor with a first inlet and a first outlet;
a nitrogen separator coupled to the first outlet, the nitrogen separator comprising a nitrogen concentrate outlet and a byproduct outlet;
a second compressor including a second inlet coupled to the nitrogen concentrate outlet, the second compressor including a second outlet for supplying concentrated nitrogen gas to a storage volume;
a turbine generator including an expander and a generator with a third inlet for coupling to the storage volume and a third outlet coupled to the second inlet such that at least a portion of the concentrated nitrogen gas exiting the third outlet flows into the second inlet; and
a vent coupled to the third outlet, wherein another portion of the concentrated nitrogen gas exiting the third outlet enters an atmosphere through the vent.

2. The power system of claim 1, wherein the nitrogen separator is a nitrogen membrane unit, a nitrogen generator, or a cryogenic separator.

3. The power system of claim 1, wherein the first and second compressors are each multi-stage compressors with one or more thermal recovery units.

4. The power system of claim 1, further comprising a pressure sensor coupled to the third inlet of the turbine generator, a control valve coupled to the third inlet of the turbine generator, and a pressure controller coupled to the pressure sensor and the control valve.

5. The power system of claim 1, wherein the nitrogen separator is a membrane unit that comprises a plurality of membrane separation stages.

6. The power system of claim 1, the storage volume being a first storage volume, the power system further comprising a second storage volume between the third outlet of the turbine generator and the second inlet of the second compressor.

7. The power system of claim 5, wherein the second storage volume is a hydrocarbon reservoir.

8. The power system of claim 1, further comprising a thermal conditioner coupled to the third inlet of the turbine generator.

9. The power system of claim 8, further comprising a bypass around the thermal conditioner, a control valve in the bypass, a thermostat coupled to the third inlet of the turbine generator between the thermal conditioner and the turbine generator, and a controller coupled to the thermostat and the control valve in the bypass.

10. The power storage system of claim 1, wherein the storage volume is a hydrocarbon reservoir.

11. The power system of claim 10, further comprising a gas reconditioner disposed between the hydrocarbon reservoir and the third inlet of the turbine generator, the gas reconditioner configured to receive a mixture of concentrated nitrogen gas and at least one of a hydrocarbon gas or a sulfur-bearing gas from the hydrocarbon reservoir, wherein the gas reconditioner is configured to remove the at least one of the hydrocarbon gas or the sulfur-bearing gas.

12. A power storage system, comprising:
a first compressor with a first inlet and a first outlet;
a nitrogen separator coupled to the first outlet, the nitrogen separator comprising a nitrogen concentrate outlet and a byproduct outlet;
a second compressor including a second inlet coupled to the nitrogen concentrate outlet, the second compressor including a second outlet for supplying a concentrated nitrogen gas to a storage volume;
a turbine generator including a third inlet for coupling to the storage volume and a third outlet coupled to the second inlet such that at least a portion of the concentrated nitrogen gas exiting the third outlet flows into the second inlet; and
a vent coupled to the third outlet, wherein another portion of the concentrated nitrogen gas exiting the third outlet enters an atmosphere through the vent.

13. The power storage system of claim 12, wherein the nitrogen separator is a nitrogen membrane unit, a nitrogen generator, or a cryogenic separator.

14. The power storage system of claim 12, wherein each of the first compressor and the second compressor has a surge control recycle line and an inlet controller.

15. The power storage system of claim 12, further comprising a thermal conditioner coupled to the third inlet of the turbine generator, a bypass around the thermal conditioner, a control valve in the bypass, a thermostat coupled to the third inlet of the turbine generator between the thermal conditioner and the turbine generator, and a controller coupled to the thermostat and the control valve in the bypass.

16. The power storage system of claim 12, wherein the storage volume is a hydrocarbon reservoir, the second outlet is coupled to the hydrocarbon reservoir, and the third inlet of the turbine generator is coupled to the hydrocarbon reservoir.

17. The power storage system of claim 12, wherein the second storage volume is a hydrocarbon reservoir.

18. The power storage system of claim 1, wherein the nitrogen separator is a membrane unit that comprises a plurality of membrane separation stages.

19. The power storage system of claim 12, further comprising a gas reconditioner including a fourth inlet coupled to the third outlet and a fourth outlet coupled to the second inlet, the fourth inlet is configured to receive a mixture including the concentrated nitrogen gas and at least one of a hydrocarbon gas or a sulfur-bearing gas from the third outlet, and wherein the gas reconditioner is configured to remove the at least one of the hydrocarbon gas or the sulfur-bearing gas.

20. The power storage system of claim 12, further comprising a pressure sensor coupled to the third inlet of the turbine generator, a control valve coupled to the third inlet of the turbine generator, and a pressure controller coupled to the pressure sensor and the control valve.

21. The power storage system of claim 20, the storage volume being a first storage volume, the power storage system further comprising a second storage volume between the third outlet of the turbine generator and the second inlet of the second compressor.

22. The power system of claim 21, wherein the storage volume is a hydrocarbon reservoir.

* * * * *